United States Patent
Korthals et al.

(10) Patent No.: US 10,114,378 B2
(45) Date of Patent: Oct. 30, 2018

(54) AUTOMATIC GUIDANCE SYSTEM WITH STABILITY CONTROL FOR AN AGRICULTURAL VEHICLE

(71) Applicant: CNH Industrial America LLC, New Holland, PA (US)

(72) Inventors: Rodney L. Korthals, Bourbonnais, IL (US); William L. Schubert, Downers Grove, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 14/567,930

(22) Filed: Dec. 11, 2014

(65) Prior Publication Data

US 2015/0160655 A1    Jun. 11, 2015

Related U.S. Application Data

(60) Provisional application No. 61/914,701, filed on Dec. 11, 2013.

(51) Int. Cl.
*B60G 17/016* (2006.01)
*G05D 1/02* (2006.01)
(Continued)

(52) U.S. Cl.
CPC ......... *G05D 1/0223* (2013.01); *A01B 69/004* (2013.01); *A01B 69/008* (2013.01); *G05D 2201/0201* (2013.01)

(58) Field of Classification Search
None
See application file for complete search history.

(56) References Cited

U.S. PATENT DOCUMENTS 5,732,371 A   3/1998   Fujita
6,122,568 A   9/2000   Madau et al.
(Continued)

FOREIGN PATENT DOCUMENTS

FR   2972168 A1   9/2012
WO   2007031817 A1   3/2007
WO   2010/070415   6/2010

OTHER PUBLICATIONS

Hongtei et al., "The Development of Vehicle Stability Control at Ford", IEEE/ASME Transactions on Mechatronics, vol. 4, No. 3, pp. 223-234, Sep. 1999.
(Continued)

*Primary Examiner* — Adam D Tissot
(74) *Attorney, Agent, or Firm* — Rickard K. DeMille; Rebecca L. Henkel

(57) ABSTRACT

A non-transitory computer-readable medium may store computer executable code. The computer executable code may include instructions to identify a turn to be taken by an agricultural vehicle and to receive a first set of data from at least one of a spatial locating system, one or more speed sensors, and one or more measurement devices. The computer executable code may also include instructions to calculate a second set of data based upon the first set of data. Further, the computer executable code may include instructions to select a vehicle action in anticipation of the turn, based on the first and second sets of data and to control a plurality of actuators to perform the vehicle action.

15 Claims, 6 Drawing Sheets

(51) Int. Cl.
*A01B 69/00* (2006.01)
*A01B 69/04* (2006.01)

(56) References Cited

U.S. PATENT DOCUMENTS

| | | |
|---|---|---|
| 6,173,221 B1 | 1/2001 | Boehringen et al. |
| 6,278,918 B1 * | 8/2001 | Dickson ............... A01B 69/001 701/23 |
| 6,345,218 B1 | 2/2002 | Yamanaka et al. |
| 6,549,835 B2 | 4/2003 | Deguchi et al. |
| 6,580,988 B2 | 6/2003 | Lin et al. |
| 6,694,237 B2 | 2/2004 | Kifuku et al. |
| 6,952,634 B2 | 10/2005 | Akita |
| 7,756,620 B2 | 7/2010 | Bedner et al. |
| 8,024,091 B2 | 9/2011 | Takenaka et al. |
| 8,036,793 B2 | 10/2011 | Auguet et al. |
| 8,046,132 B2 | 10/2011 | Auguet et al. |
| 8,086,383 B2 | 12/2011 | Takenaka et al. |
| 8,275,516 B2 * | 9/2012 | Murphy ............... A01B 69/00 701/124 |
| 8,509,994 B2 | 8/2013 | Koukes et al. |
| 2003/0093208 A1 | 5/2003 | Hessmert et al. |
| 2006/0122754 A1 * | 6/2006 | McLaren ............. A01B 69/008 701/51 |
| 2010/0094511 A1 | 4/2010 | Krueger et al. |
| 2011/0231061 A1 * | 9/2011 | Reeve ................. A01B 69/008 701/41 |
| 2012/0095649 A1 | 4/2012 | Klier et al. |
| 2012/0174445 A1 * | 7/2012 | Jones .................. A01B 69/007 37/197 |
| 2012/0215410 A1 * | 8/2012 | McClure ............. A01B 79/005 701/50 |

OTHER PUBLICATIONS

European Search Report for European Application No. 14197050.9 dated Jun. 1, 2015 (5 pages).

* cited by examiner

AUTOMATIC GUIDANCE SYSTEM WITH STABILITY CONTROL FOR AN AGRICULTURAL VEHICLE

CROSS REFERENCE TO RELATED APPLICATIONS

This application claims priority from and the benefit of U.S. Provisional Patent Application No. 61/914,701, entitled "Automatic Guidance System with Stability Control for an Agricultural Vehicle," filed Dec. 11, 2013, which is hereby incorporated by reference in its entirety.

BACKGROUND

The subject matter described herein relates generally to agricultural vehicles such as tractors. Specifically, the present embodiments described below relate to automatic guidance systems with stability control that may be employed in agricultural vehicles.

Many types of agricultural vehicles (e.g., tractors, combines, sprayers, etc.) may benefit from an automatic guidance system that navigates the vehicle through a preselected area. The automatic guidance system typically has an array of sensors, accelerometers, and other measurement devices to monitor the state of the vehicle (e.g., current speed, road slope, vehicle orientation, etc.). Other computer systems within the agricultural vehicle may also provide data to the automatic guidance system. An operator may upload or select information regarding the preselected area, and start the automatic guidance system, which uses the information regarding the state of the vehicle and the preselected area to navigate the vehicle.

During operation, an agricultural vehicle may approach a swath line or a sharp turn; in such a situation, the automatic guidance system may arbitrarily limit the steering angle of the vehicle. The arbitrary limit for the steering angle may lead to poor turns by the agricultural vehicle, which may result in the vehicle being unable to follow the swath line, transition to a new swath line, or curve properly. Instances in which the agricultural vehicle veers off-course may result in loss of crop, or premature disengagement of the automatic guidance system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, an agricultural vehicle may include a plurality of actuators configured to control at least one system for turning the agricultural vehicle, a spatial locating system, one or more speed sensors, and one or more measurement devices. The agricultural vehicle may also include an automatic guidance system configured to navigate the agricultural vehicle. The automatic guidance system includes a receiver component configured to receive a first set of data from at least one of the spatial locating system, the one or more speed sensors, or the one or more measurement devices; a calculation component configured to calculate a second set of data based on the first set of data; a decision component configured to select a vehicle action based on the first and second sets of data; and an actuation component configured to control the plurality of actuators to perform the vehicle action.

In a second embodiment, a non-transitory computer-readable medium may store computer executable code. The computer executable code may include instructions to identify a turn to be taken by an agricultural vehicle and to receive a first set of data from at least one of a spatial locating system, one or more speed sensors, and one or more measurement devices. The computer executable code may also include instructions to calculate a second set of data based upon the first set of data. Further, the computer executable code may include instructions to select a vehicle action in anticipation of the turn, based on the first and second sets of data and to control a plurality of actuators to perform the vehicle action.

In a third embodiment, a method may include identifying a turn to be taken by an agricultural vehicle and receiving a first set of data from at least one of a spatial locating system, one or more speed sensors, and one or more measurement devices. The method may also include calculating a second set of data based upon the first set of data. Further, the method may include selecting a vehicle action in anticipation of the turn, based on the first and second sets of data, and controlling a plurality of actuators to perform the vehicle action.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. The term "component" refers to a computer-related entity, either hardware, software, firmware, software in execution, or a combination of hardware and software.

Present embodiments relate to automatic guidance systems for agricultural vehicles. Specifically, the embodiments described below relate to automatic guidance systems with stability control. The automatic guidance system may generally navigate an agricultural vehicle through a preselected area. In particular, the automatic guidance system may determine an appropriate vehicle action based on the data collected by measurement devices or parameters derived from measured data regarding the state of the agricultural vehicle. This may enable the automatic guidance system to make informed decisions that increase the overall stability of the agricultural vehicle during operation. The increased stability may reduce the likelihood that the agricultural vehicle veers off-course or makes poor turns during operation. Further, the informed decisions by the automatic guidance system may also improve the ability of the automatic guidance system to navigate the agricultural vehicle from one swath line to another swath line while reducing the likelihood that the agricultural vehicle veers off-course or makes a poor turn.

Figure 1:
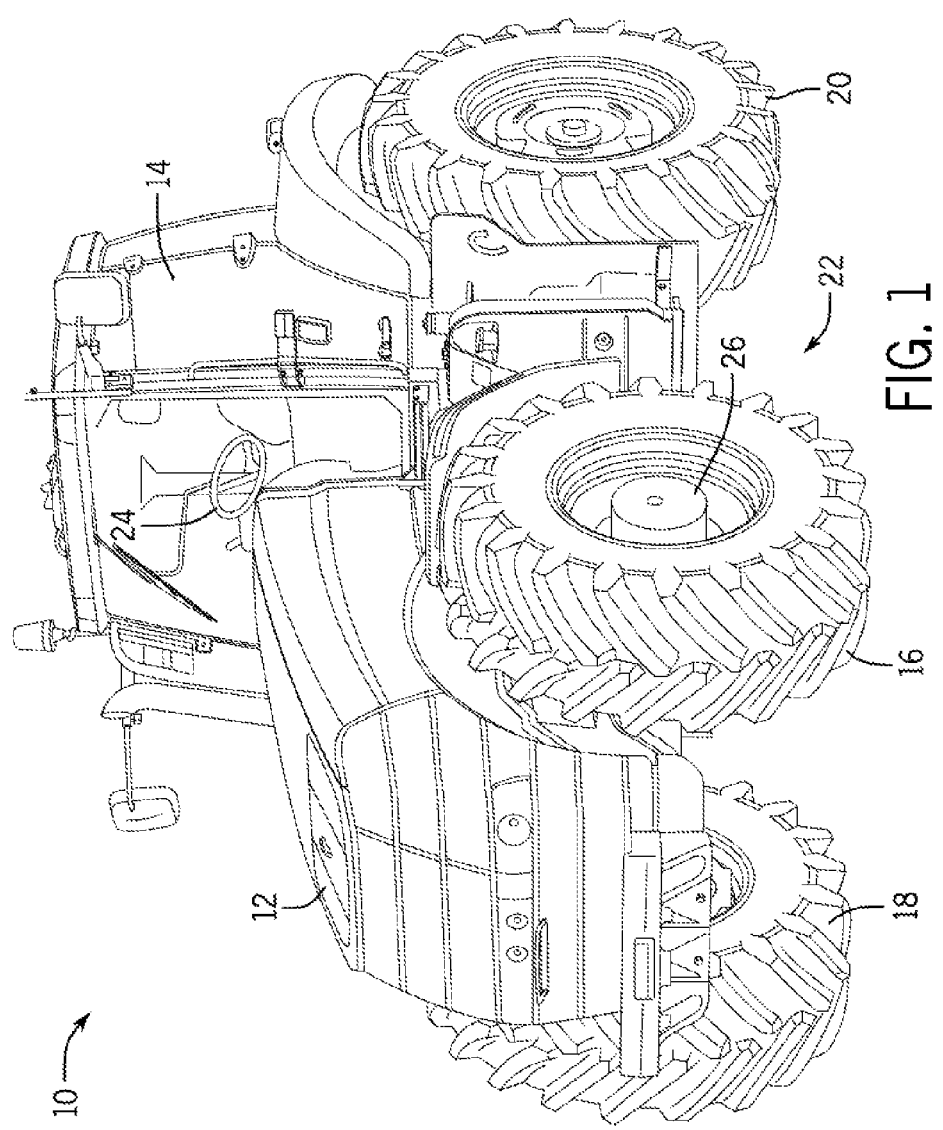
FIG. 1 is a perspective view of an embodiment of an agricultural vehicle that may employ an automatic guidance system with stability control.

With the foregoing in mind, FIG. 1 illustrates an exemplary agricultural vehicle, in this case a tractor 10. As will be appreciated, the tractor 10 is merely an example, and the present embodiments may used in be any type of agricultural vehicle (e.g., combines, sprayers, etc.) which may benefit from an automatic guidance system. The tractor 10 includes a body 12 that may house an engine, transmission, and power train (not separately shown). Further, the tractor 10 includes a cabin 14 where an operator may sit or stand to operate the tractor 10.

The tractor 10 has a front left wheel 16, a front right wheel 18, a rear left wheel 20, and a rear right wheel 22 (not visible) that rotate to move the tractor 10. The tractor 10 also includes a steering wheel 24 that causes the wheels 16 and 18 to turn (i.e., front-wheel drive). The steering wheel 24 may be mechanically coupled to the wheels 16, 18, 20, and 22, or may be communicatively coupled to a computer system that controls the wheels via actuators. As illustrated, the wheels 16 and 18 may be coupled together by an axle 26 so that both wheels 16 and 18 may be rotated together. In some embodiments, the steering wheel 24 may cause the wheels 20 and 22 to turn (i.e., rear-wheel or four-wheel drive). In certain embodiments, the tractor 10 may use a continuous track system or a combination of tracks and tire drives to move.

Figure 2:
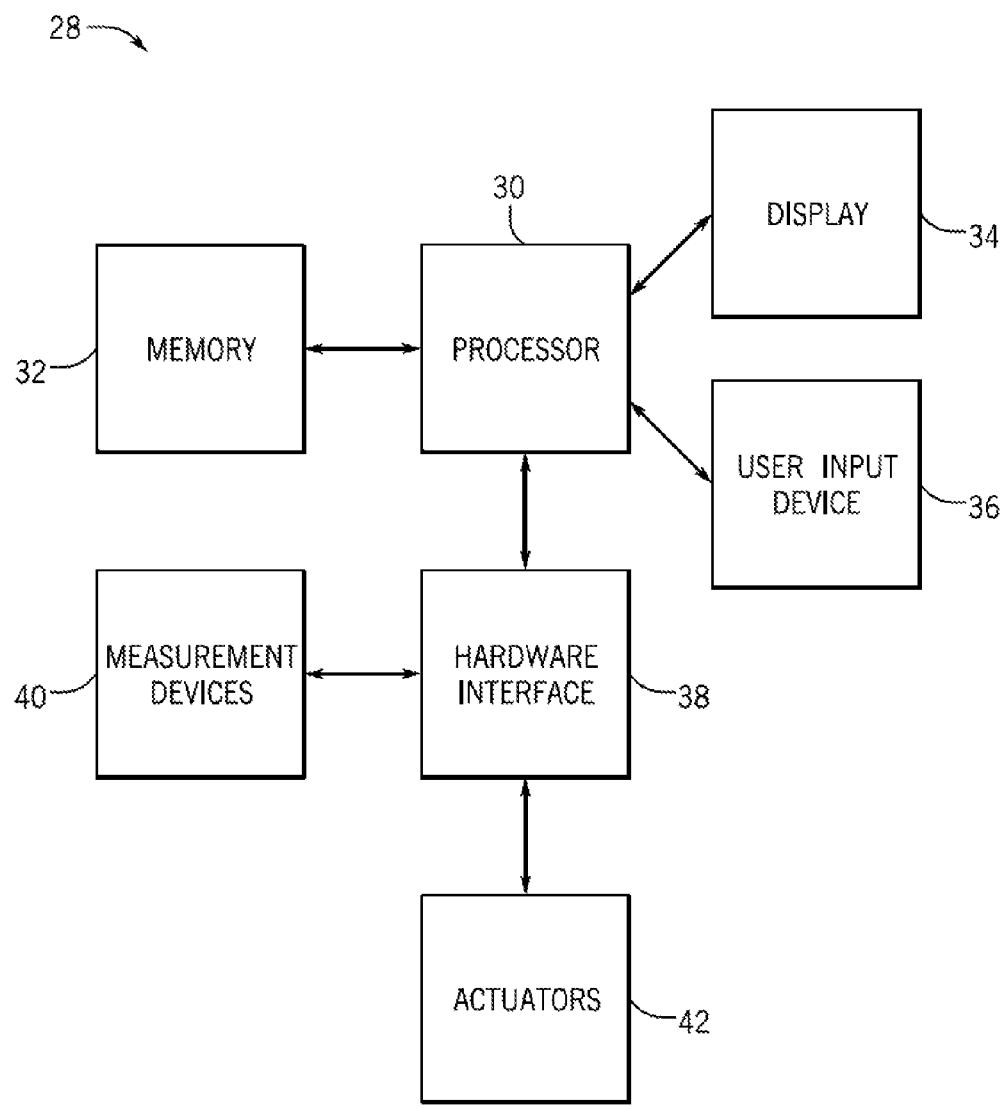
FIG. 2 is a block diagram of an embodiment of a computer system that may be employed in the agricultural vehicle of FIG. 1.

FIG. 2 depicts a block diagram of an embodiment of a computer system 28 that may be employed in the tractor 10. The computer systems 28 may monitor and control various parameters regarding the operation of the tractor 10 (e.g., climate control, emissions monitoring, security functions, etc.). The computer system 28 includes a processor 30 and memory 32, as illustrated. The processor 30 may execute instructions stored on the memory 32 to perform various computer processes. The processor 30 may include, for example, general-purpose single- or multi-chip microprocessors. In addition, the processor 30 may be any conventional special purpose processor, such as an application-specific processor or circuitry. The memory 32 may be a mass storage device, a FLASH memory device, removable memory, etc. The computer system 28 may also include a display 34 and a user input device 36.

Further, the computer system 28 may include a hardware interface 38 suitable for interacting with measurement devices 40 and actuators 42. Accordingly, the processor 30 may be communicatively coupled to measurement devices 40 such that the processor may receive data from the measurement devices 40. In response to the measurement devices 40 data, the processor 30 may then execute instructions stored on the memory 32 to control components of the tractor 10 (e.g., wheels 16 and 18) via the actuators 42. The actuators 42 may include valves, pumps, switches, and so on, useful in performing control actions such as turning the wheels 16 and 18. In some embodiments, the computer system 28 may use the actuators 42 to navigate the tractor 10, as described further below.

Figure 3:
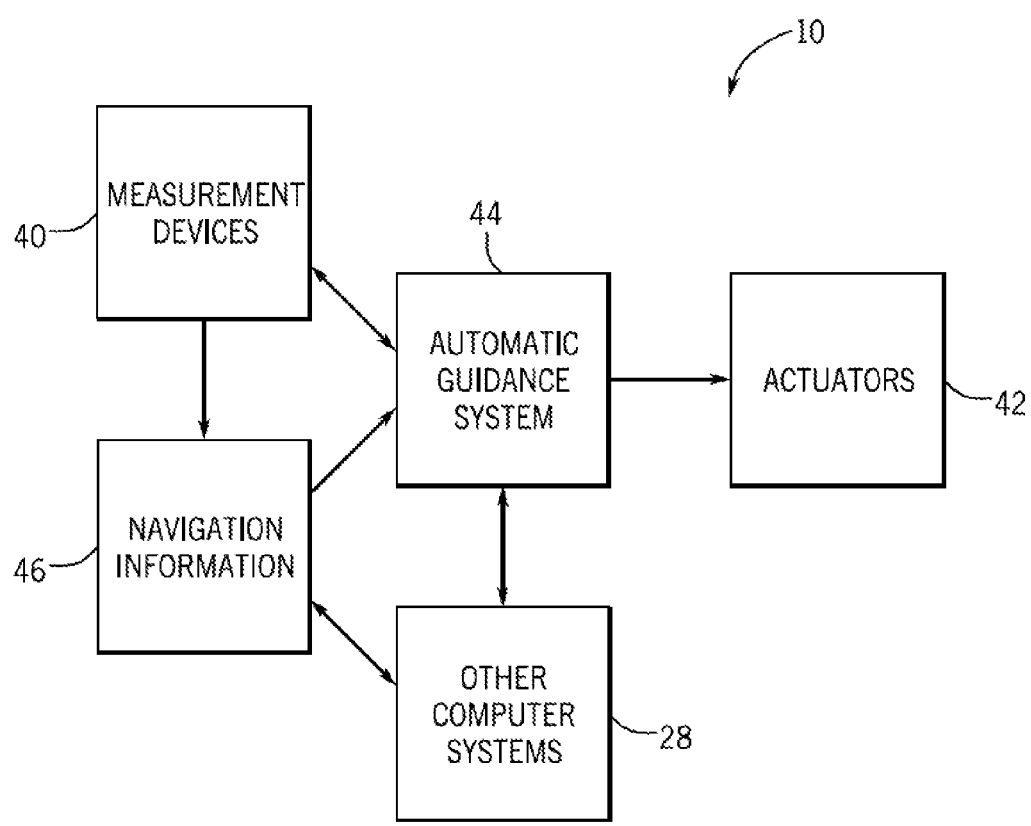
FIG. 3 is a block diagram of an embodiment of the agricultural vehicle that includes an automatic guidance system that may be employed in the agricultural vehicle of FIG. 1.

FIG. 3 illustrates a block diagram of an embodiment of the tractor 10 that includes an automatic guidance system 44 that may be employed in the tractor 10. The automatic guidance system 44 may include a particular type of computer system 28 that autonomously navigates the tractor 10 through a designated area. As may be appreciated, the automatic guidance system 44 may include a computer system that operates in real-time. The automatic guidance system 44 may receive data from measurement devices 40 regarding the current state of the tractor 10. This data may include the speed of the tractor 10, a yaw rate of the tractor 10, and the spatial locating system information (e.g., from a global positioning system (GPS)) of the tractor 10, among other things. The automatic guidance system 44 may derive other types of data based on the measurement devices 40 data, as discussed in further detail below. In certain embodiments, the automatic guidance system 44 may receive information from other computer systems 28 on board the tractor 10.

The automatic guidance system 44 may also receive navigation information 46 regarding the designated area. For example, the navigation information 46 may include a map (e.g., a swath map) detailing the area and planned trajectory for the tractor 10. Furthermore, the navigation information 46 may also include other types of data such as a suggested maximum speed for traversing the designated area, such that the agricultural task (e.g., spraying pesticides) may be properly performed. In some embodiments, the navigation information 46 may be supplied directly to the automatic guidance system 44 by an operator (e.g., via a universal serial bus (USB) device, via the display 34 and the user input device 36, etc.). In other embodiments, the automatic guidance system 44 may receive navigation information 46 without an operator, such as by downloading navigation information 46 from a remote computer system via a communications link (e.g., local area network (LAN)). In certain embodiments, the navigation information 46 may also be provided by the measurement devices 40 or other computer systems 28 on board the tractor 10.

Based on the data regarding the current state of the tractor 10 and the navigation information 46, the automatic guidance system 44 navigates the tractor 10 through the preselected area As such, the automatic guidance system 44 may make informed decisions that increase the stability of the tractor 10, particularly during turns. The increased stability of the tractor 10 may reduce the likelihood that the tractor 10 veers off-course, and may reduce the likelihood of loss of crop. Additionally, the informed decisions by the automatic guidance system 44 may increase the efficiency of transitions between swath lines by the tractor 10.

Figure 4:
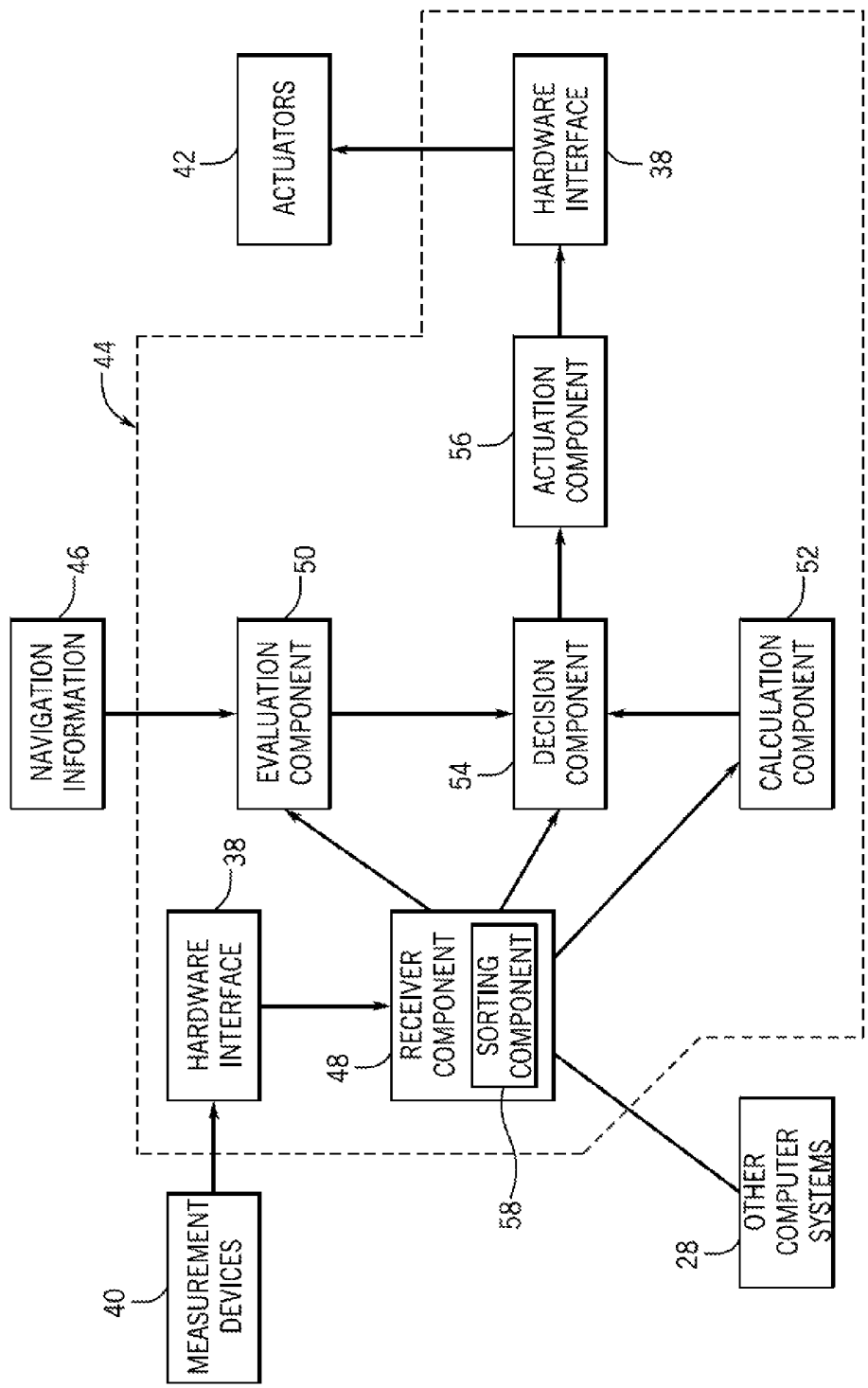
FIG. 4 is a block diagram of an embodiment of the automatic guidance system of FIG. 3.

FIG. 4 depicts a block diagram illustrating a more detailed view of an embodiment of the automatic guidance system 44. The automatic guidance system 44 includes a receiver component 48, an evaluation component 50, a calculation component 52, a decision component 54, and an actuation component 56, as shown. The automatic guidance system 44 may also interact with the measurement devices 40 and the actuators 42 via the hardware interface 38, and may receive data from other computer systems 28, as well as navigation information 46, as described above.

The receiver component 48 may receive incoming data from the measurement devices 40 and other computer systems 28. In certain embodiments, the receiver component 48 may also receive the navigation information 46. For example, an operator may select a swath map via the display 34 and a user input device 36; in this situation, the swath map may be received through the receiver component 48. Because the receiver component 48 may receive various types of information from a variety of sources, the receiver component 48 may include a sorting component 58. The sorting component 58 may sort the information received based on the particular component that will next receive the information.

The evaluation component 50 may determine whether or not the current trajectory of the tractor 10 should be maintained. That is, the evaluation component may receive trajectory data (e.g., spatial location) from the measurement devices 40 or from other computer systems 28 via the receiver component 48. The evaluation component 50 may also have access to navigation information 46, which may be stored on the memory 32. In certain embodiments, the evaluation component 50 may receive navigation information 46 via the receiver component 48, as described above. The evaluation component 50 may use the trajectory data as well as the navigation information 46 to determine if the tractor 10 should continue in a straight line or if the tractor 10 should turn in a particular direction. As will be appreciated, the evaluation component 50 may consider a motion at any angle other than 0° to be a "turn." For example, moving the tractor 10 5° to the right to realign with the swath line and a full 90° turn to move from one swath line to another may both be considered to be a "turn" by the evaluation component 50. Furthermore, the evaluation component 50 may consider any motion that requires a change in the steering angle of the tractor 10 to be a "turn."

In some embodiments, the evaluation component 50 may be integrated with the decision component 54, such that one component performs both sets of tasks. The decision component 54, as described in further detail below, may generally determine the next vehicle action for the tractor 10. However, as noted above, the automatic guidance system 44 may operate in real-time. As such, in certain embodiments it may be beneficial to have one component that identifies whether the tractor 10 should continue in a straight line or turn, and other component that, based on that identification, determines the actual action the tractor 10 should take. Such a configuration, by increasing the number of components, may reduce the amount of work done by the decision component 54, thereby reducing its latency as well as that of the automatic guidance system 44.

The calculation component 52 uses data from the receiver component 48 to derive other types of information useful to the automatic guidance system 44. For example, the receiver component 48 may pass along data relating to the yaw rate of the tractor 10 and the calculation component 52 may use the yaw rate data to determine the slip angle of the tractor 10.

The decision component 54 may receive data from the receiver component 48, the evaluation component 50, and the calculation component 52 as inputs. Based on this data, the decision component 54 may determine the next appropriate action that the tractor 10 should take. For example, the decision component 54 may determine the next appropriate action based at least on current speed, current road slope, vehicle orientation, and a projected turn radius based on the current speed. In some embodiments, the decision component 54 may also use data relating to the center of gravity of the tractor 10, the current yaw rate, the width of a wheelbase of the tractor 10, the actual or predicted lateral acceleration, and the slip angle, among other things. In some embodiments, vehicle constants such as the center of gravity of the tractor and the width of the wheelbase may be stored in the memory 32.

A vehicle action may be any specific action that can be performed by the actuators 42 when selected by the decision component 54. In some embodiments, vehicle actions may be limited to actions that can be performed by just one system in the tractor 10. For example, vehicle actions may include, but are not limited to, moving the tractor 10 at the current speed and with the current steering angle (i.e., moving the tractor in a straight line); decreasing the speed of the tractor 10 without adjusting the steering angle; increasing the speed of the tractor 10 without adjusting the steering angle; and adjusting the steering angle of the tractor 10 without adjusting the speed. In other embodiments, a vehicle action may be sequence of actions performed by one or more systems in the tractor 10 that change the operational state of the tractor 10 (i.e., turning the tractor or continuing in a straight line). For instance, a vehicle action relating to turning the tractor 10 may be adjusting the steering angle of the tractor 10 and adjusting the speed of the tractor 10.

Figure 5:
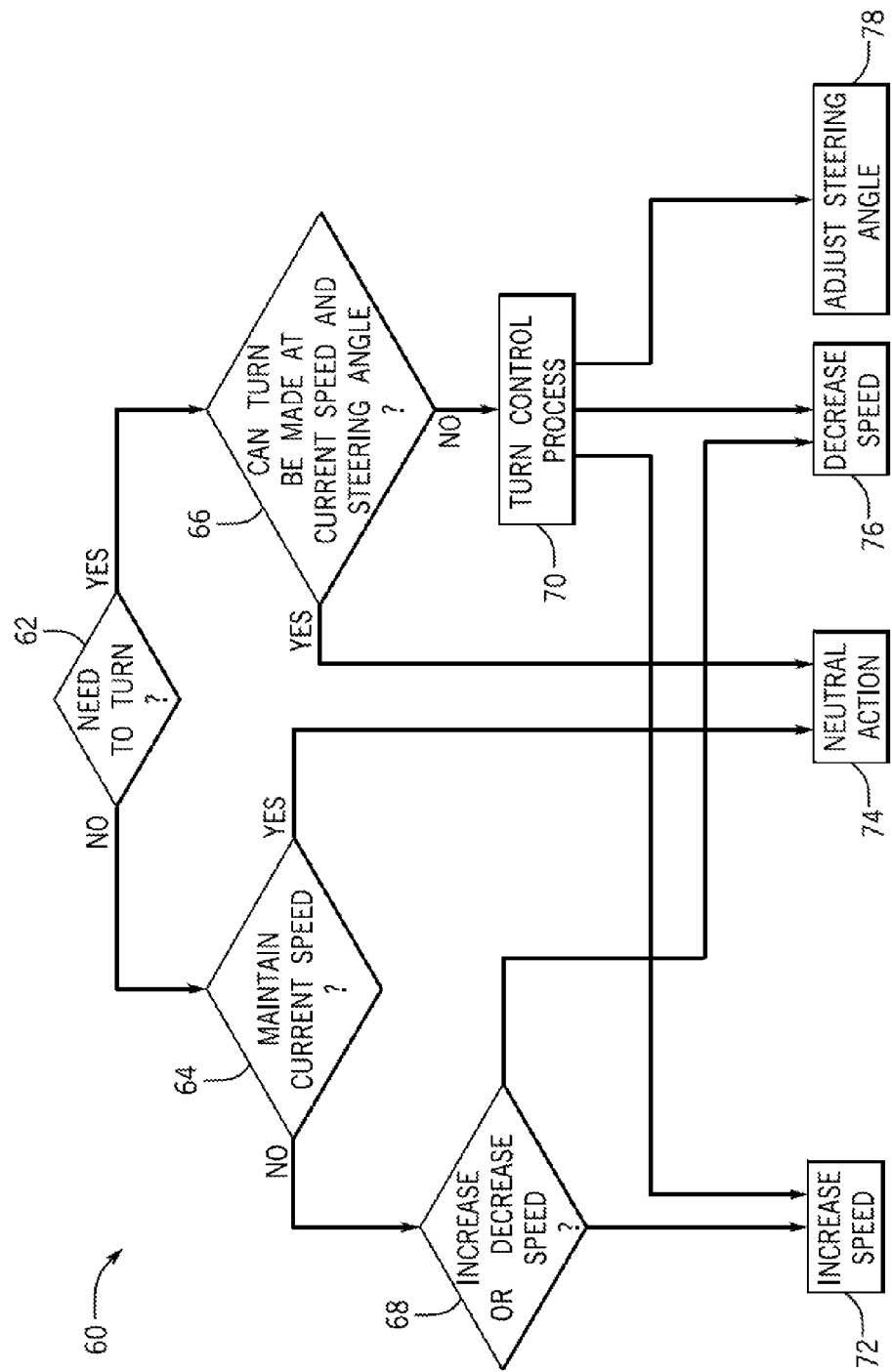
FIG. 5 is a flow chart of an embodiment of a decision process that may be executed by the automatic guidance system of FIG. 3.

FIG. 5 illustrates a flow chart of an embodiment of a decision process that may be executed by the decision component 54. In some embodiments, the decision component 54 may repeatedly execute the decision process 60 (i.e., real-time operation), as mentioned above. For example, the decision component 54 may be configured to execute the decision process 60 every 1 ms. In other embodiments, the decision component 54 may execute the decision process 60 at certain intervals (e.g., at certain locations on the swath line, every 5 minutes, etc.) or in certain situations (e.g. throughout the entirety of a turn larger than or equal to 45°.

At block 62, the decision component 54 determines whether the tractor 10 needs to turn. This information may be provided by the evaluation component 50. If the decision component 54 determines that the tractor 10 does not need to turn, then at block 64 it evaluates whether the tractor 10 should maintain its current speed, which may be provided by the measurement devices 40 via the receiver component 48. If the speed of the tractor 10 needs to change, then the decision component 54 determines whether the speed should be increased or decreased at block 68. Based on the results of block 68, the decision component 54 may select vehicle action 72 or 76, which correspond to increasing or decreasing speed, respectively. If, at block 64, the decision component 54 determines that the current speed of the tractor 10 should be maintained, it will then select a neutral vehicle action 74, in which the speed and steering angle of the tractor 10 remain unchanged.

If, at block 62, the decision component 54 determines that the tractor 10 should make a turn, it will proceed to block 66. During block 66, the decision component 54 will then evaluate whether the turn can be made at the current speed and steering angle. To make this decision, the decision component 54 may take into account the current speed of the tractor 10, the road slope, the vehicle orientation, the projected turn radius, and other inputs regarding the state of the tractor 10, as noted above. If the decision component 54 determines, based on the inputs, that the turn can be made at the current speed and steering angle, then it may select the neutral action 74. If not, then the decision component 54 may proceed to turn control process 70. By evaluating a variety of data regarding the state of the tractor 10 at block 66, the automatic guidance system 44 may navigate the tractor 10 more accurately, particularly during turns. This, in turn, may reduce the likelihood of loss of crop and premature disengagement of the automatic guidance system 44, as mentioned above. This may also increase the efficiency of transitions between swath lines, also mentioned above.

Figure 6:
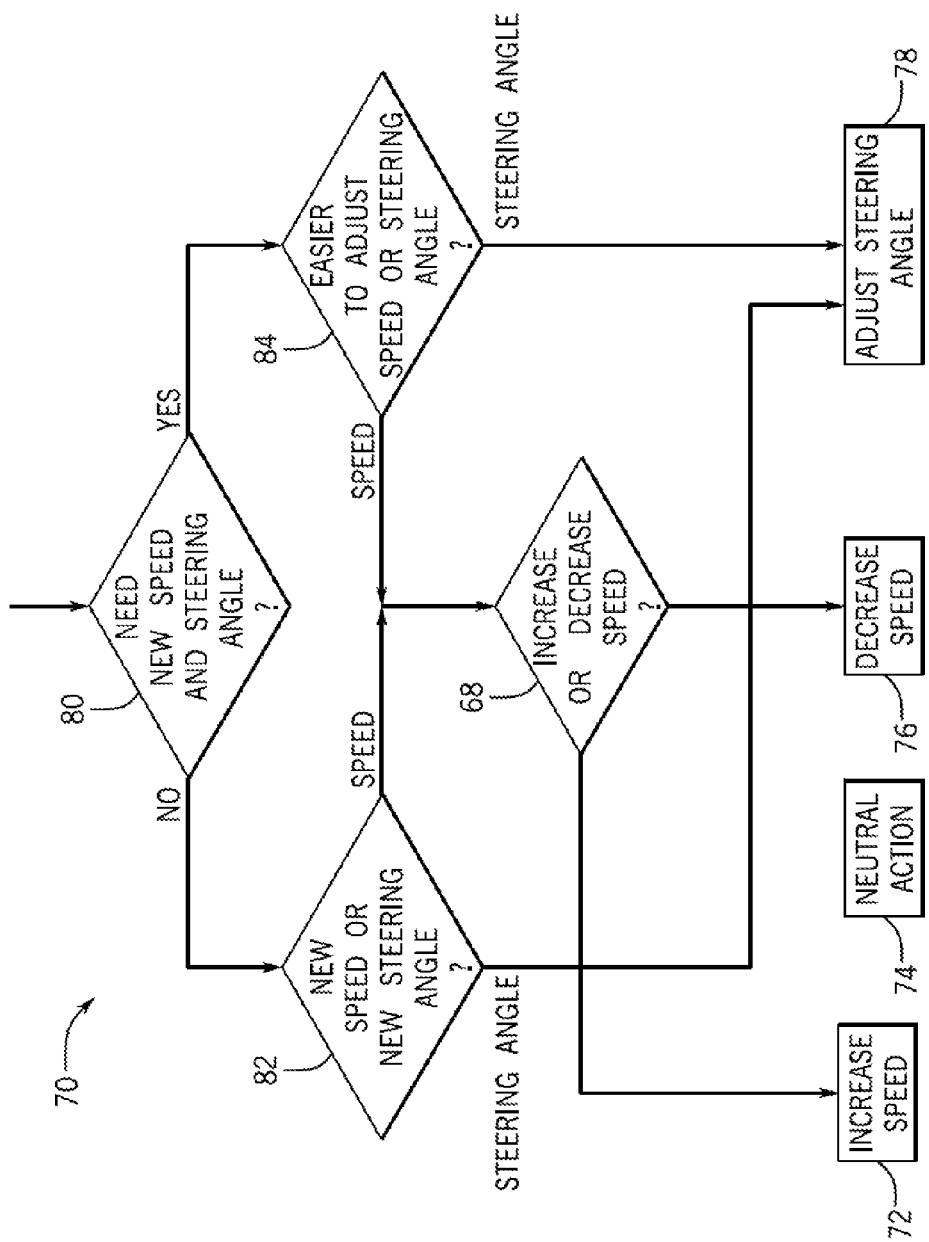
FIG. 6 is a flow chart of an embodiment of a turn control process that may be executed as part of the decision process of FIG. 5

FIG. 6 illustrates a flow chart depicting the turn control process 70 that may be executed as part of the decision process 60. At block 80, the decision component 54 determines whether both the speed and the steering angle should be changed, based on factors such as current speed, road slope, vehicle orientation, center of gravity, and the projected turn radius. If both the speed and the steering angle do not need to be changed, the decision component proceeds to block 82, which determines whether one of a new speed or a new steering angle is determined. If the current speed of the tractor 10 should be changed (i.e., decreased), then the decision component 54 proceeds to block 68 and the appropriate vehicle action 72 or 76, as described above. If the steering angle of the tractor 10 should be adjusted, then the decision component 54 selects vehicle action 78, which corresponds to adjusting the steering angle.

If, at block 80, the decision component 54 determines that both the speed and the steering angle of the tractor 10 should be changed, then the decision component 54 evaluates at block 84 whether it is more feasible to change the speed or the steering angle. For example, the decision component 54 may decide, given the current speed of the tractor 10, that it may be more realistic to adjust the steering angle by 10° than to decrease the speed by 5 miles per hour. Based on the results of block 84, the decision component 54 may proceed to block 68 and select vehicle action 72 or 76, or may select vehicle action 78, as described above. In other embodiments, if the decision component 54 determines that both the speed and the steering angle of the tractor 10 should be changed at block 80, the decision component 54 may select vehicle action 78 and one of vehicle actions 72 or 76, as described above.

After the decision component 54 selects a vehicle action 72, 74, 76, or 78, the actuation component 56 then controls the respective actuators 42 via the hardware interface 38 to perform the action. For example, vehicle action 78 corresponds to adjusting the steering angle of the tractor 10, while the neutral vehicle action 74 corresponds to maintaining the current state of the actuator 42.

One or more of the disclosed embodiments, alone or in combination, may provide one or more technical effects useful for automatic guidance systems employed in agricultural vehicles. Certain embodiments may increase the stability of agricultural vehicles that rely on automatic guidance systems for general operation. For example, the present embodiments may determine vehicle actions such as adjusting a speed of the vehicle or adjusting a steering angle of the vehicle based on the area to be traversed and information related to the state of the agricultural vehicle. As such, the present embodiments may reduce the likelihood that the agricultural vehicle makes a poor turn or otherwise veers off-course, which may subsequently reduce the likelihood of damages, loss of crop, and premature disengagement of the automatic guidance system, which prompts manual emergency maneuvers. The present embodiments may also increase the accuracy and efficiency of transitions between swath lines performed by the agricultural vehicle. The technical effects and technical problems in the specification are exemplary and not limiting. It should be noted that the embodiments described in the specification may have other technical effects and may solve other technical problems.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural vehicle, comprising:
a plurality of actuators configured to control at least one system for turning the agricultural vehicle;
a spatial locating system;
one or more speed sensors;
one or more measurement devices; and
an automatic guidance system configured to navigate the agricultural vehicle, wherein the automatic guidance system comprises:
a receiver component configured to receive a first set of data from at least one of the spatial locating system, the one or more speed sensors, or the one or more measurement devices;
a calculation component configured to calculate a second set of data based on the first set of data;
a decision component configured to:
determine whether one of or both of a steering angle of the agricultural vehicle and a speed of the agricultural vehicle should be adjusted based on the first and second sets of data;
in response to a determination that one of the steering angle or speed of the agricultural vehicle should be adjusted, adjust the steering angle or speed of the agricultural vehicle, respectively; and
in response to a determination that both of the steering angle and speed of the agricultural vehicle should be adjusted, select a preferred vehicle action between adjusting the steering angle of the agricultural vehicle and adjusting the speed of the agricultural vehicle given the first and second sets of data; and
an actuation component configured to control the plurality of actuators to adjust the vehicle speed or steering angle of the agricultural vehicle in response to the decision component.

2. The agricultural vehicle of claim 1, wherein the automatic guidance system further comprises an evaluation component configured to determine whether a current trajectory of the agricultural vehicle should be maintained.

3. The agricultural vehicle of claim 1, wherein the receiver component is configured to receive at least a portion of the first or second sets of data from a computer system of the agricultural vehicle that is not a part of the automatic guidance system.

4. The agricultural vehicle of claim 1, wherein the first set of data comprises at least one of a speed of the agricultural vehicle and a spatial location of the agricultural vehicle.

5. The agricultural vehicle of claim 1, wherein the second set of data comprises at least one of a road slope, an orientation of the agricultural vehicle, and a projected turn radius.

6. The agricultural vehicle of claim 1, wherein the receiver component is configured to receive a third set of data, and the decision component is configured to determine whether one of or both of a steering angle of the agricultural vehicle and a speed of the agricultural vehicle should be adjusted based on the first and second sets of data based on the first, second, and third sets of data.

7. The agricultural vehicle of claim 6, wherein the third set of data comprises at least one of a yaw rate, a slip angle, an actual lateral acceleration, and a predicted lateral acceleration, and wherein the receiver component is configured to receive at least a portion of the third set of data from a computer system of the agricultural vehicle that is not part of the automatic guidance system.

8. The agricultural vehicle of claim 1, wherein the decision component is configured to determine whether one of or both of a steering angle of the agricultural vehicle and a speed of the agricultural vehicle should be adjusted based on the first and second sets of data based on a third set of data in addition to the first and second sets of data, the third set of data comprising vehicle constants.

9. The agricultural vehicle of claim 8, wherein the third set of data comprises at least one of a center of gravity of the agricultural vehicle and a width of the wheelbase of the agricultural vehicle.

10. The agricultural vehicle of claim 8, wherein the third set of data is stored on a memory of the agricultural vehicle.

11. The agricultural vehicle of claim 1, wherein the automatic guidance system is configured to navigate the agricultural vehicle according to a swath map.

12. A non-transitory computer-readable medium storing computer executable code that when executed by at least one processor of an automatic guidance system of an agricultural vehicle causes the automatic guidance system to:
    identify a turn to be taken by the agricultural vehicle;
    receive a first set of data from at least one of a spatial locating system, one or more speed sensors, and one or more measurement devices;
    calculate a second set of data based upon the first set of data;
    determine, via the automatic guidance system, whether one of or both of a steering angle of the agricultural vehicle and a speed of the agricultural vehicle should be adjusted based on the first and second sets of data;
    in response to a determination that one of the steering angle or speed of the agricultural vehicle should be adjusted, adjust the steering angle or speed of the agricultural vehicle, respectively;
    in response to a determination that both of the steering angle and speed of the agricultural vehicle should be adjusted, select a preferred vehicle action between adjusting the steering angle of the agricultural vehicle and adjusting the speed of the agricultural vehicle given the first and second sets of data;
    control a plurality of actuators to adjust the vehicle speed or steering angle of the agricultural vehicle in response to the decision component.

13. The non-transitory computer-readable medium of claim 12, wherein the first set of data comprises at least one of a speed of the agricultural vehicle and a spatial location of the agricultural vehicle.

14. The non-transitory computer-readable medium of claim 12, wherein the second set of data comprises at least one of a road slope, an orientation of the agricultural vehicle, and a projected turn radius.

15. A method for controlling an automatic guidance system of an agricultural vehicle, comprising:
    identifying, via the automatic guidance system, a turn to be taken by the agricultural vehicle;
    receiving, via the automatic guidance system, a first set of data from at least one of a spatial locating system, one or more speed sensors, and one or more measurement devices;
    calculating, via the automatic guidance system, a second set of data based upon the first set of data;
    determining, via the automatic guidance system, whether one of or both of a steering angle of the agricultural vehicle and a speed of the agricultural vehicle should be adjusted based on the first and second sets of data;
    in response to a determination that one of the steering angle or speed of the agricultural vehicle should be adjusted, adjusting the steering angle or speed of the agricultural vehicle, respectively;
    in response to a determination that both of the steering angle and speed of the agricultural vehicle should be adjusted, selecting a preferred vehicle action between adjusting the steering angle of the agricultural vehicle and adjusting the speed of the agricultural vehicle given the first and second sets of data;
    controlling, via the automatic guidance system, a plurality of actuators to adjust the vehicle speed or steering angle of the agricultural vehicle in response to the decision component.

* * * * *